Dec. 12, 1972    R. C. JONES ET AL    3,706,099
GRAPHIC RECORDER EMPLOYING A RESERVOIR
LETTERING PEN TYPE STYLUS
Filed Dec. 14, 1970                                2 Sheets-Sheet 1
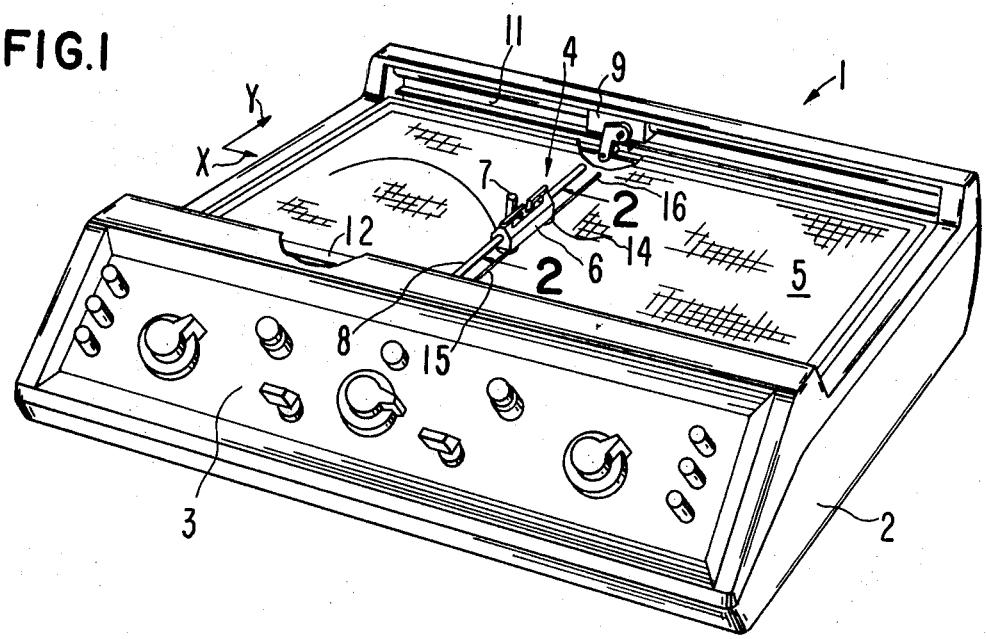
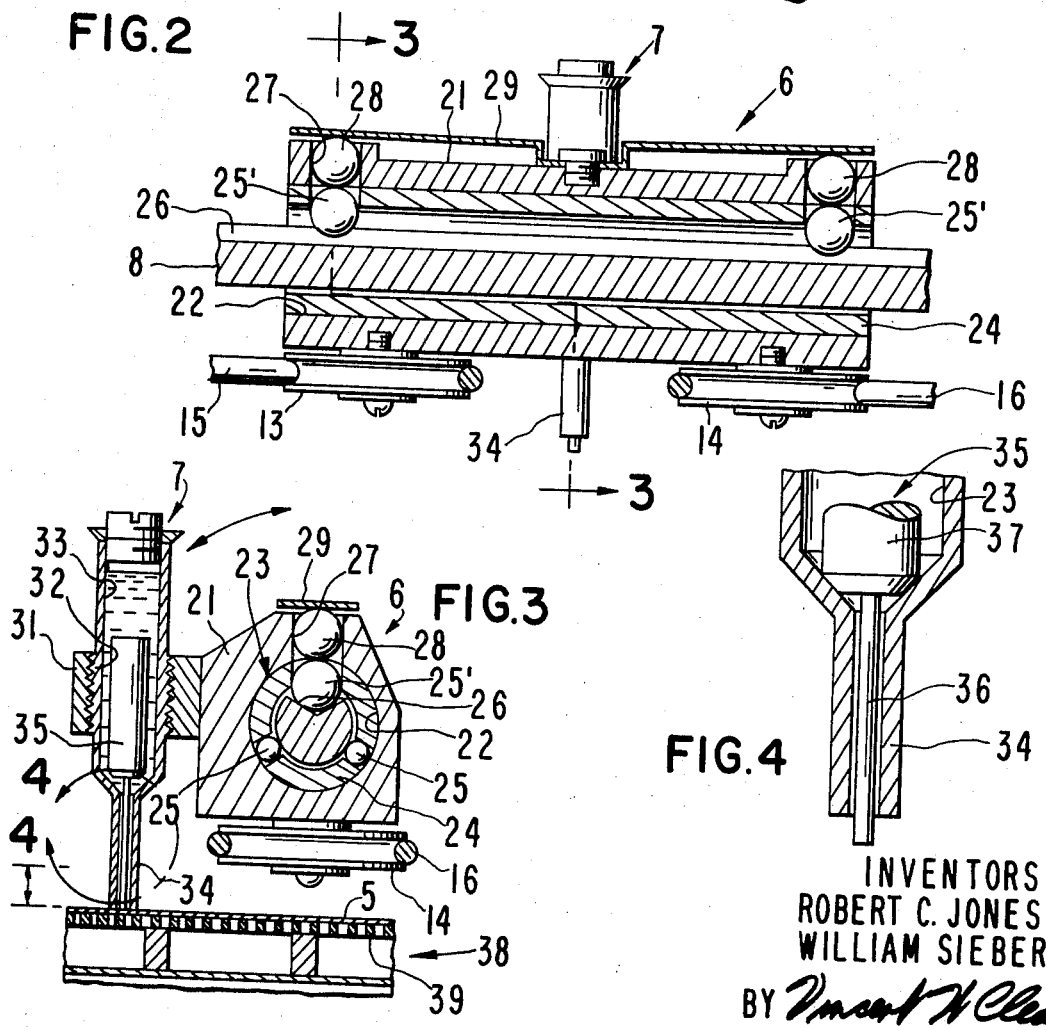
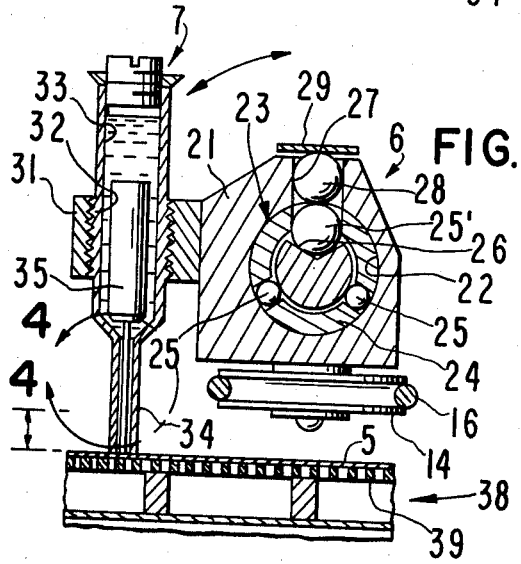
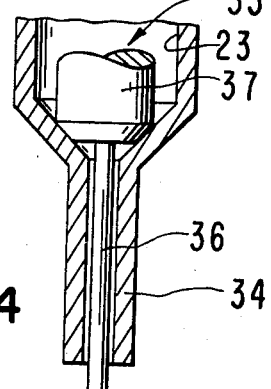
INVENTORS
ROBERT C. JONES
WILLIAM SIEBERT JR.
BY Vincent N Cleary
ATTORNEY

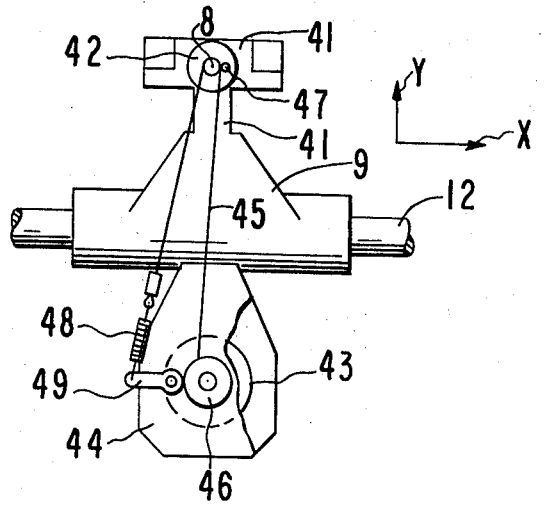
FIG.5
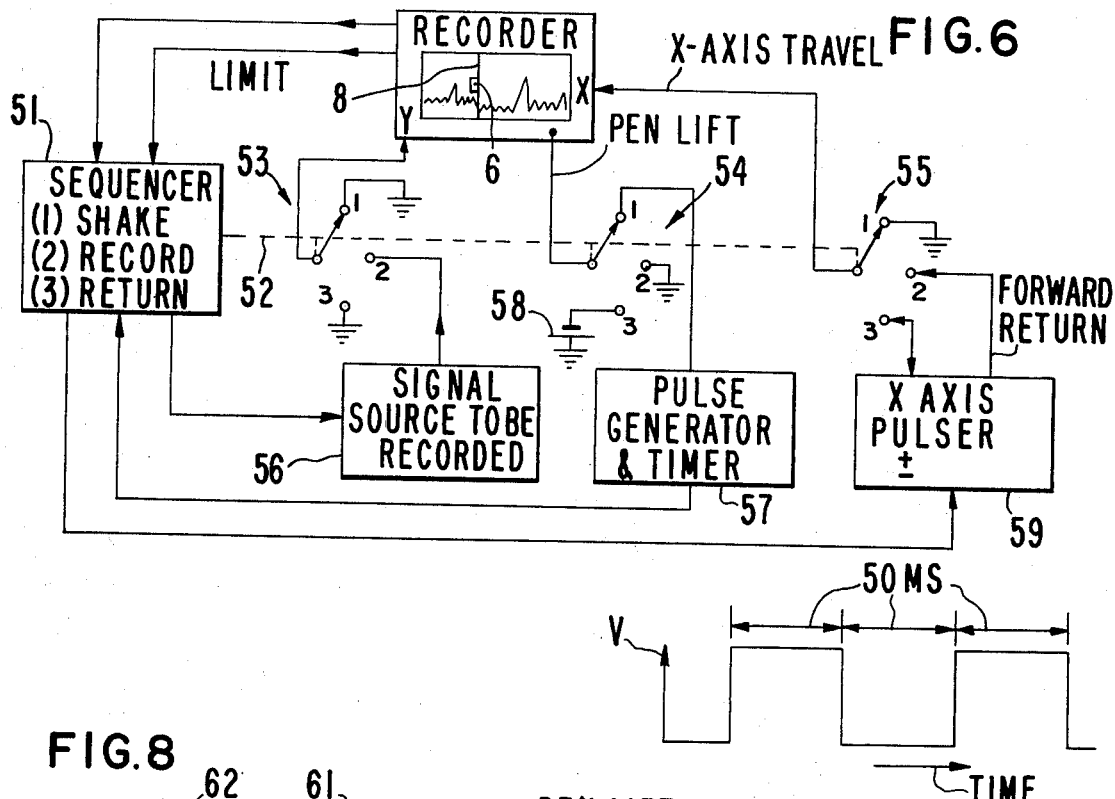
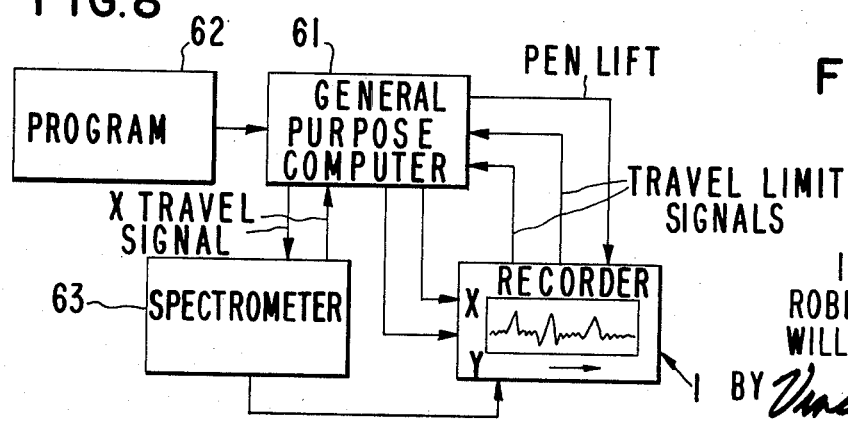

United States Patent Office 3,706,099
Patented Dec. 12, 1972

3,706,099
GRAPHIC RECORDER EMPLOYING A RESERVOIR LETTERING PEN TYPE STYLUS
Robert C. Jones and William Siebert, Jr., Santa Clara County, Calif., assignors to Varian Associates, Palo Alto, Calif.
Filed Dec. 14, 1970, Ser. No. 97,634
Int. Cl. G01d 15/16
U.S. Cl. 346—140
4 Claims

ABSTRACT OF THE DISCLOSURE

A graphic recorder employing a reservoir lettering pen type stylus is disclosed. The stylus includes a reservoir for ink interconnected to the stylus by means of an ink passageway. A movable and weighted cleaning plunger is disposed in the ink passageway for unclogging the pen. A motorized pen shaker, responsive to a train of pulses, shakes the pen prior to the recording phase of the operating cycle of the recorder to assure that the pen will write. A sequencer or programmed general purpose computer sequences the shaking of the pen.

DESCRIPTION OF THE PRIOR ART

Heretofore, the operating cycle of a recorder has been sequenced by means of a programmed general purpose computer which also controls the operating cycle of a spectrometer. The output of the spectrometer was recorded by the recorder. The recorder used a reservoir lettering pen as the inking stylus, such pen including a weighted cleaning plunger. Inking pens of this type produce a uniform black trace without skipping even at relatively high writing speed. In many cases the computer controlled spectrometer and recorder operate unattended for many hours. In some cases the computer controlled spectrometer time averages the spectral data for relatively long periods of time, as of hours, after which the data is read out of the computer and the resultant signal is fed to the recorder for recording. In these cases the recorder operates intermittently in an unattended manner with relatively long periods of time between recordings. In many cases it is found that the recording pen becomes clogged due to the drying of ink in the pen. Therefore the pen does not write and the information which it is desired to record is lost. If the machine were attended by an operator, the operator would remove the pen, shake it a few times to unclog the stylus. The pen is then reinstated into the pen holder of the recorder and the signal to the recorder is fed to the recorder for recording.

It is desired to obtain means for automatically cleaning the recording pen prior to the recording phase of the operating cycle of the recorder such that the pen will be unclogged and a complete recording obtained.

SUMMARY OF THE PRESENT INVENTION

The principal object of the present invention is the provision of an improved graphic recorder of the type using a reservoir lettering pen as the writing stylus.

One feature of the present invention is the provision, in a graphic recorder, of means for repetitively shaking the recording pen to produce movement of a cleaning plunger in the pen for unclogging the pen in use.

In another feature of the present invention, the means for shaking the pen comprises a motorized means responsive to a train of actuating pulses produced by a pulse generator.

In another feature of the present invention, the recorder includes a bar extending over the recording surface with a pen carriage slidable thereon for holding the recording pen to one side of the bar and means are provided for pivotably oscillating the bar, plus carriage, and pen about the longitudinal axis of the bar for shaking the pen.

Another feature of the present invention is the same as the preceding feature wherein the means for pivotably oscillating the bar, carriage, and pen includes a rotary solenoid having an output coupled to the pivotable bar by means of a drive cable and including means for spring biasing the bar against rotation by the rotary solenoid such that actuation of the rotary solenoid causes the pen to be pivoted in one direction and the spring bias causes the pen to be pivoted in the opposite direction for shaking the pen.

In another feature of the present invention, a sequencer sequences the operating cycle of the recorder according to a predetermined program which sequences the pen shaking phase of the operating cycle just prior to the recording phase of the operating cycle of the recorder.

In another feature of the present invention, a general purpose computer, responsive to a sequence program, serves to sequence the pen shaking and recording phase of the operating cycle of the recorder.

Other features and advantages of the present invention will become apparent upon a perusal of the following drawings wherein:

BRIEF DESCRIPTION OF THE DRAWINGS

FIG. 1 is a perspective view of an X–Y recorder incorporating features of the present invention, FIG. 2 is an enlarged sectional view of a portion of the structure of FIG. 1 taken along line 2—2 in the direction of the arrows, FIG. 3 is a sectional view of the structure FIG. 2 taken along line 3—3 in the direction of the arrows modified to show the pen and holder in section, FIG. 4 is an enlarged detailed view of that portion of the structure FIG. 3 delineated by line 4—4, FIG. 5 is an enlarged detail view, partly broken away, of a portion of the structure of FIG. 1 delineated by line 5—5 and depicting the pen shaking mechanism, FIG. 6 is a schematic circuit diagram, partly in block diagram form, for a recorder incorporating features of the present invention, FIG. 7 is a waveform diagram showing the pen shaker actuating pulses, and FIG. 8 is a schematic circuit diagram, in block diagram form, depicting a computer operating spectrometer and recorder incorporating features of the present invention.

DESCRIPTION OF THE PREFERRED EMBODIMENTS

Referring now to FIG. 1, there is shown an X–Y type recorder 1 employing features of the present invention. The recorder 1 includes a housing 2 having a front panel portion 3 with various control knobs. The housing 2 contains various servo motors, pre-amplifiers, potentiometers, and drive pulleys of conventional design, not shown, for moving a recording per assembly 4 over the surface of a recording medium 5, such as paper. The paper 5 is disposed over a flat recording surface or bed formed by a perforated plate having a vacuum drawn on the lower side thereof for causing atmospheric pressure to press the recording paper 5 against the recording bed.

The pen assembly 4 includes a pen carriage 6 which holds the recording pen 7, such pen being of the reservoir lettering type commonly known as a Leroy pen made by Keuffel and Esser Co. The pen 7 is shown in greater detail in FIGS. 3 and 4. The pen carriage 6 holds the pen 7 to one side of a bar 8 on which the pen carriage is slideable. The bar 8 extends generally parallel to the plane of the recording medium 5 and across the recording medium in the Y direction. The ends of the bar 8 are rotationally supported in bearings carried in a pair of sliding supports 9 which slide on two guide rails 11 and 12 extending parallel to the surface of the recording paper 5 and in the X direction along opposite side edges of the recording paper 5. A pulley arrangement, not shown, serves to pull the bar 8 in the X direction in variable accordance with an input signal or as a function of time, whereas the pen carriage 6 is driven along the bar 8 in the Y direction in response to the Y input signal via pulleys 13 and 14 and drive cables 15 and 16. Recorder 1 is of the type generally disclosed in U.S. Pat. 3,213,460 issued Oct. 19, 1965 and assigned to the same assignee as the present invention.

Referring now to FIGS. 2 and 3, the pen carriage 6 includes a block structure 21 having an axial bore 22 therein. A hollow cylindrical bearing 23 is disposed within the bore 21 and is held therein via set screws, not shown. The bearing structure 23 includes a bearing race 24 having pairs of ball bearings 25, disposed at the 120° and 240° positions about the carriage bar 8 which passes axially through the bearing 23.

The carriage bar 8 is provided with a V-shaped key slot 26 which receives one pair of larger ball bearings 25' which serve to key the pen carriage 6 to the carriage bar 8. Vertical bores 27 in the carriage housing 21 and bearing race 24 intersect with the position of the key slot 26 and a second ball bearing 28 its position in each bore 27 for holding the first ones of the larger ball bearings 25' in place within the key slot 26. A retaining spring 29 serves to retain the ball bearings 28 and 25' within the bores 27 and within the bearing race 24.

A pen holding arm 31 extends out from the carriage block 21 to one side of the carriage bar 8. The pen holding arm 31 has a vertical bore therein which receives the pen 7. The bore 32 is threaded to mate the threads on the outside of the barrel of the pen 7 for holding the pen in the holding arm.

The pen 7 includes a hollow cylindrical reservoir portion 33 which is necked down to a thin wall small diameter tube 34 forming the stylus for applying the ink to the recording medium or paper 5. A cleaning plunger 35 is provided in the reservoir 33 and the plunger includes a cleaning wire portion 36 that extends into the ink passageway in the stylus 34, as shown in greater detail in FIG. 4. Cleaning plunger 35 includes a solid weighted cylindrical upper portion 37 affixed to the cleaning wire portion 36. The plunger 35 is free to move within the barrel and stylus portions 33 and 34 of the pen for unclogging the ink passageway interconnecting the reservoir 33 and the writing end of the stylus 34. The cleaning wire 36, when the plunger 35 is in its lower most position, extends slightly below the open end of the stylus 34 and the upper portion 37 serves as a valve for sealing off the flow of ink from the reservoir 33 to the inking stylus 34. However, when the stylus end 34 of the pen 7 is brought into engagement with the writing surface of the recording medium 5, the cleaning wire is pressed up into the stylus 34 and the upper portion 37 of the plunger 35 is raised from its seat to permit the flow of ink from the reservoir to the stylus 34. The recording paper 5 is held to the bed 38 of the recorder 1 by a vacuum drawn on the underside of the paper through a perforated plate 39.

Referring now to FIG. 5, there is shown an apparatus for lifting and shaking the pen. More particularly, the carriage bar 8 is rotationally supported at its ends in a generally T-shaped bracket 41 via the intermediary of ball bearing assemblies 42. The base legs of the T-bracket 41 are fixedly secured to the X axis sliders 9 which slide on the respective guide rails 11 and 12. A rotary solenoid 43 is fixedly secured to a bracket 44 which in turn is affixed to the slider 9.

The output shaft of the rotary solenoid 43 extends through the bracket 44 and a pen lifting drive cable 45 is wound around the output shaft of the rotary solenoid. The bitter end of the lifting cable 45 is secured to the output shaft of the rotary solenoid via a clamping collar 46. The pen lifting cable 45 is wrapped around the carriage slide bar 8 and is fixedly secured to the slide bar by means of a screw 47 passing into the bar 6 and serving to clamp the pen lifting cable 45 to the carriage bar 8. The other end of the pen lifting cable is passed around carriage bar 8 and is connected to the bracket 44 via the intermediary of a spring 48 and an adjusting arm 49 bolted to the bracket 44. The spring 48 serves to spring bias the carriage bar 8 against rotation due to the action of the rotary solenoid 43. More particularly, when the rotary solenoid is energized, the pen lifting cable 45 is taken up on the output shaft to the rotary solenoid to turn the pen carriage bar 8 in a clockwise direction by an angle to cause the pen to be lifted by a distance of approximately one-eighth of an inch above the surface of the recording medium 5. The pen 7 is held in the elevated position as long as the rotary solenoid is energized. When the rotary solenoid is deenergized, the spring 48 turns the pen carriage bar 8 in the counter-clockwise direction to return the pen 7 to the surface of the recording medium 5.

Referring now to FIG. 6, there is shown, in block diagram form, an X-Y recorder 1 incorporating features cf the present invention. More particularly, a sequencer 51 has an output shaft 52 which gangs together three rotary switches 53, 54 and 55. The signal source 56 of signals to be recorded, such as a spectrometer, is connected to the second terminal of the first rotary switch 53 and the other two terminals, namely terminals 1 and 3 of switch 53 are grounded. A pulse generator and timer 57 is connected to the first terminal of rotary switch 54 for supplying a train of voltage pulses having a waveform as depicted in FIG. 7. The pulse generator includes a timer which causes the pulse generator to generate a train of approximately ten pulses and then an output is fed to the sequencer 51 indicating to the sequencer 51 that the sequence of pulses from the pulse generator 57 has terminated. The third terminal of rotary switch 54 is connected to battery 58 for supplying a constant or holding voltage to the switch 54.

An X-axis pulser 59 is connected to the second and third terminals of the rotary switch 55. The output of the X-axis pulser 59, which is applied to the second terminal, constitutes a train of pulses causing the pen 7, and its carriage 6 to travel in the positive X direction across the recording medium 5, whereas the output of the pulser 59, which is connected to the third terminal of the rotary switch 55, constitutes a train of pulses of the opposite polarity for causing the pen and its carriage to move in the reverse or return direction across the recording medium. The first terminal of switch 55 is grounded.

The output of rotary switch 53 is fed to the Y-axis input of the recorder. The output of rotary switch 54 is fed to the pen lifting rotary solenoid 43, and the output of the third rotary switch 55 is fed to the X-axis travel motor for causing the pen 7 and its carriage 6 to move in the X direction. Two limit switches are provided at opposite ends of the recorder for delivering an output to the sequencer 51 for indicating when the pen and its carriage have reached the X-axis limits of their travel.

In operation, sequencer 51 starts the operating cycle of the recorder 1 with the pen and its carriage to the left side of the recording medium. In other words, the pen and its carriage have been returned to the starting position. The rotary switches 53–55 are then switched by the sequencer 51 to the first positions, which causes a train of pulses to be delivered to the rotary solenoid for shaking the pen for cleaning thereof. On the termination of the pulse train, the pulse generator 57 sends an output to the sequencer 51 which causes the sequencer to advance the rotary switches to the second position which starts the record phase of operation.

In the record phase, the signal to be recorded is initiated by an output of the sequencer 51 fed to the signal source 56 and the output signal therefrom is fed to the Y-axis for recording as a function of time or as a function of another variable fed into the X-axis pulser 59. The sequencer 51 also sends an output to the X-axis pulser 59 causing the pulser to be energized for causing X-axis travel in the forward direction. When the pen 7 and its carriage 6 have reached the end of the recording, the output of the X-axis travel limit switch is fed to the sequencer 51 which causes the rotary switches 53–55 to be advanced to the third position.

In the third position, the pen 7 and carriage 6 are returned via return pulses supplied from the X-axis pulser 59 and holding voltage is fed to the pen lifting rotary solenoid 43 to cause the pen to be lifted for its return travel. When the pen has reached the end of its travel, namely, the start of the recording, the limit switch is actuated which sends an indication to the sequencer 51 and the sequence can then be repeated.

Referring now to FIG. 8, there is shown an alternative of the embodiment of the present invention wherein the sequencer 51 and rotary switches 53–55 are replaced by a general purpose computer 61 which has been programmed by a program 62 to carry out the sequence previously disclosed in FIG. 6 and also to operate a spectrometer 63 serving as the signal source to be recorded. The program 62 causes the general purpose computer to generate a train of approximately ten pulses of the waveform shown in FIG. 7. The pulses are fed to the pen lifting rotary solenoid 43 for shaking the pen. After the pulses have been fed to the pen lifter, the computer 61 has an output fed to the spectrometer for causing the spectrometer to start a sweep through the spectrum of the sample under analysis and the spectrum output signal from the spectrometer is fed to the Y-axis of the recorder for recording as a function of the X direction travel of the recorder, as determined by an X-axis pulser or timing signal generated within the computer 61 and fed to the X-axis input channel of recorder 1. When the pen 7 and its carriage 6 reach the limit of the recording, the output from the limit switch is fed to the computer, and the computer lifts the pen and returns the carriage to a starting position and the cycle is ready to be repeated.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a graphic recorder apparatus, a recording medium on which to record ink traces of signals to be recorded, a recording pen means having an ink reservoir and stylus with an ink passageway interconnecting said reservoir and stylus for depositing ink traces on said recording medium in accordance with signals to be recorded, means for moving said recording pen means across the recording medium in response to signals to be recorded, said recording pen means having a movable cleaning plunger therein for unclogging the ink passageway interconnecting said ink reservoir and said stylus of said pen, means for repetitively shaking said recording pen to produce movement of said cleaning plunger along the axis of the ink passageway for unclogging aid pen, said means for moving said recording pen across the recording medium includes, a bar extending over the recording surface generally parallel to the recording surface, a pen carriage means for holding said recording pen to one side of said bar and being slidable on said bar, and wherein said means for shaking said recording pen includes, means for pivotally oscillating said bar, carriage, and pen about the longitudinal axis of said bar, said means for pivotally oscillating said bar, carriage and pen about the longitudinal axis of said bar includes, rotary solenoid means having a rotatable output shaft, a drive cable to be taken up by rotation of said shaft and connected to said bar for rotating said bar upon being taken up on said shaft, means for spring biasing said bar against rotation by said rotary solenoid means, and means for repetitively actuating said rotary solenoid means to repetitively pivot said pen in one direction and such movements in said one direction being interspersed with spring-biased movements in the other direction to shake said recording pen, said means for repetitively actuating said rotary solenoid includes, pulse generator means for supplying a train of actuating pulses to said rotary solenoid, sequencer means for sequencing the operating cycle of the recorder apparatus according to a predetermined program which sequences the train of pen shaking pulses to said rotary solenoid prior to sequencing the signal to be recorded to said means for moving said recording pen across the recording medium.

2. The apparatus of claim 1 wherein said sequencer means comprises computer means, and program means for programming the operating sequence into said computer means.

3. In a graphic recorder apparatus, a recording medium on which to record ink traces of signals to be recorded, a recording pen means having an ink reservoir and stylus with an ink passageway interconnecting said reservoir and stylus for depositing ink traces on said recording medium in accordance with signals to be recorded, means for moving said recording pen means across the recording medium in response to signals to be recorded, said recording pen means having a movable cleaning plunger therein for unclogging the ink passageway interconnecting said ink reservoir and said stylus of said pen, means for repetitively shaking said recording pen to produce movement of said cleaning plunger along the axis of the ink passageway for unclogging said pen, wherein said means for shaking said recording pen includes, motorized means coupled to said pen for transmitting a shaking motion to said pen, and pulse generator means for generating a train of actuating pulses, and means for selectively feeding the train of actuating pulses to said motorized means to transmit a shaking motion to said pen, sequencer means for sequencing the operating cycle of the recorder and for sequencing the train of actuating pulses to said motorized pen shaking means, spectrometer means having an output coupled to the recorder for obtaining a spectrum signal to be recorded by the recorder, and wherein said sequencer means sequences the train of pulses to said motorized pen shaker immediately preceding sequencing the signal recording portion of the operating cycle of the recorder.

4. The apparatus of claim 3 wherein said sequencer means includes a general purpose computer coupled to said spectrometer and the recorder for controlling operations of said spectrometer and recorder and program means for programming said computer means for sequencing the operating cycle of said spectrometer and recorder.

References Cited

UNITED STATES PATENTS

| 2,548,583 | 4/1951 | Boyajian et al. | 346—146 |
| 2,976,103 | 3/1961 | Flanders e al. | 346—29 |
| 3,209,365 | 9/1965 | Fasola | 346—140 |
| 3,213,460 | 10/1965 | Gilovich | 346—29 |
| 3,270,349 | 8/1966 | Murphy | 346—46 |

FOREIGN PATENTS

| 503,718 | 12/1954 | Italy | 346—140 |

JOSEPH W. HARTARY, Primary Examiner

U.S. Cl. X.R.

346—34